Nov. 17, 1931.  W. THOMAS  1,832,266
CHECK VALVE FOR COLUMN INDICATORS
Filed April 2, 1928
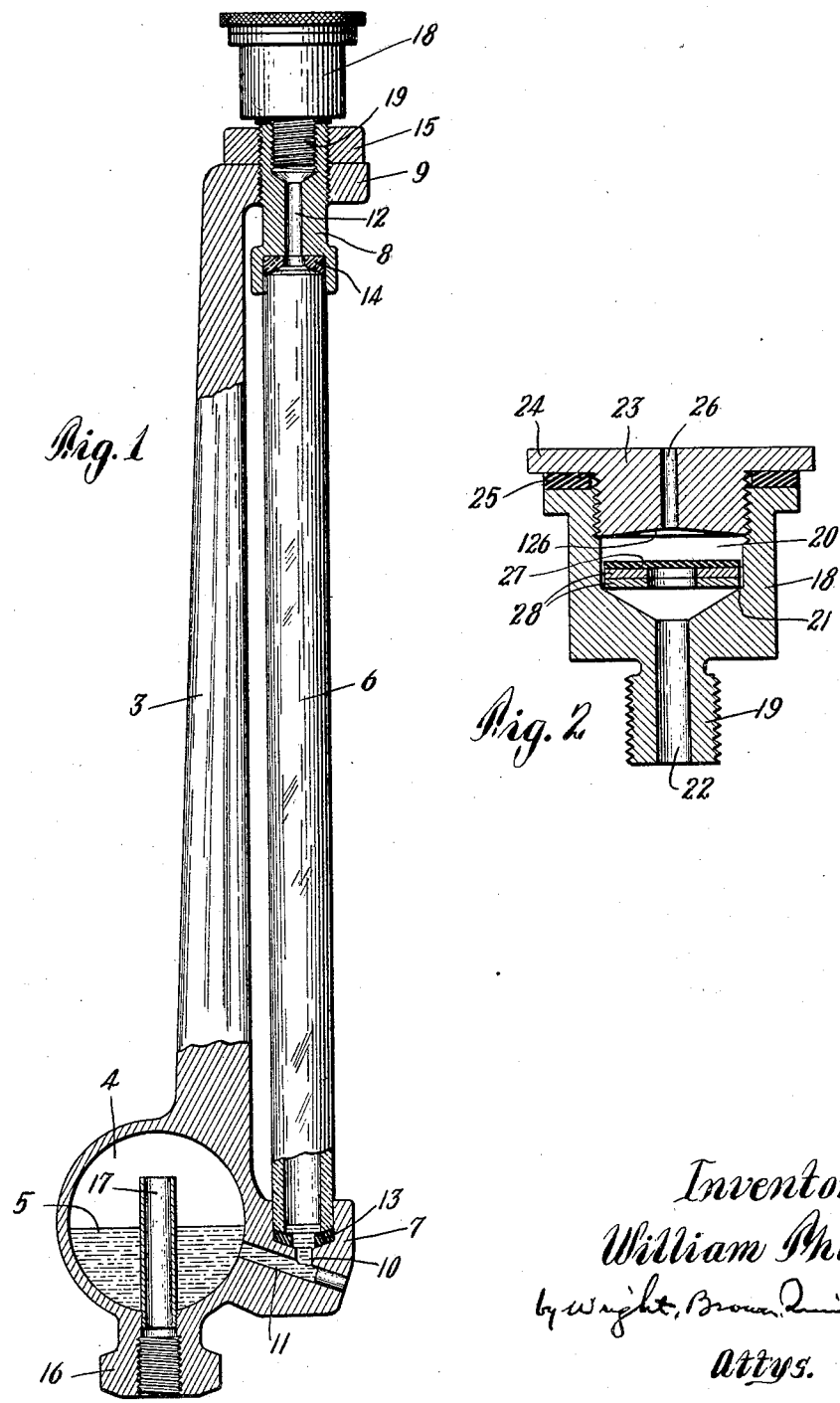
Inventor:
William Thomas.
by Wright, Brown, Quinby & Hay
attys.

Patented Nov. 17, 1931

1,832,266

UNITED STATES PATENT OFFICE

WILLIAM THOMAS, OF BOGOTA, NEW JERSEY, ASSIGNOR TO PNEUMERCATOR COMPANY, OF BROOKLYN, NEW YORK, A CORPORATION OF MAINE

CHECK VALVE FOR COLUMN INDICATORS

Application filed April 2, 1928. Serial No. 266,568.

The present invention relates to manometers of the column type, and similar indicating instruments in which the indication is made by a column of liquid standing in an upright tube which is open at the upper end for venting. The object of the upper end is to provide an effective means which will permit the outer air to enter the upper end of the tube freely and at the full pressure of such medium when the column descends, and permit free escape of the air when the column rises, but will prevent overflow and escape of the indicating liquid when pressure is applied tending to raise the column to a height above the top of the tube, whether the rise of the column is slow and gradual or rapid.

For convenience of description in further explaining the object and nature of the invention, I will assume that the instrument to which it is applied is a manometer of the column type and that the indicating column is composed of a body of mercury and is raised and lowered by fluctuations of fluid pressure. The check valve in which the new features of the invention reside is intended and adapted more especially for service with mercury column instruments and has capabilities for closing and sealing a vent against the escape of mercury which are not possessed by any of the devices heretofore suggested for performing a similar object with mercury or other fluids. Nevertheless this statement is not to be taken as limiting the invention to use with mercury only; neither is my protection limited to a manometer only, to the exclusion of other indicators of the column type. On the contrary, I intend the term "manometer" as hereinafter used, unless appropriately qualified by the context, to typify and include generally all column indicators of whatever sort and for whatever purpose used, excluding only those which are closed to the outer air at the top of the tube.

It is of course essential in the use of such indicators that the outer air have free ingress and egress to the tube above the head of the indicating column in order that the height of the column may be a true measure of the pressure acting on the body of mercury from which the column rises. It is also of great importance that none of the mercury be permitted to escape, since an undetected loss of mercury destroys the reliability of the indicator, and replenishment, in case of loss, of exactly the amount lost is difficult and requires the exercise of great care by a skilled person. Yet losses are liable to occur either through slow accretion of pressure greater than the head of the column when raised to the top of the tube, or by application of pressure so suddenly as to impart momentum to the mercury sufficient to throw the top of the column above the top of the tube, unless checked. My purpose in producing this invention is to provide automatic means which will effectually prevent losses of mercury notwithstanding inattention or carelessness on the part of those charged with the duty of observing and using the manometer. The invention consists in a novel check valve adapted and suitable for this purpose, and having the characteristics described and claimed in the following specification and illustrated in the drawings furnished herewith; and in the combination of such check valve with a manometer or similar indicator of the column type.

In the drawings,—

Fig. 1 is a partial section and partial elevation of a manometer typifying any indicating instrument of the column type, with which is combined a check valve embodying the novel features of this invention;

Fig. 2 is a sectional view of a check valve containing the preferred embodiment of the invention.

Like reference characters designate the same parts in both figures.

A support 3, of any suitable character, with which is associated a chamber 4 containing a body of mercury 5, holds a manometer tube 6. The lower end of the tube is set into a lug or bracket 7 projecting from the base of the support, and its upper end is held by a tubular clamp 8 screw threaded through a lug 9 of the support and having a socketed end which receives the adjacent end of the tube. The bore of the tube is in communication through passages 10 and 11 in the lug 7 with the interior of chamber 4 so as to receive mercury from such chamber, and also with the bore 12 of the holding clamp 8. The indicator tube, which is preferably made of glass in accordance with common practice, is packed at its ends by compressible washers 13 and 14, contained in the sockets in the lug 7 and clamp 8, respectively. It is clamped tightly enough for the purposes of use by screwing down the clamp 8 and may be released by withdrawing the clamp. The latter is secured in position by a lock nut 15. 16 represents a nipple at the base of the chamber 4 for connection with the source of fluid pressure to be measured by the manometer, and a tube 17 rises from the nipple into the chamber to a height above the level of mercury.

The instrument thus described is typical or representative of any manometer of the column type, and the details of construction thus described are illustrative, but not intended to be taken as limiting the scope of the invention.

A check valve 18 is mounted at the top of the column by means of a threaded nipple 19 on its casing which is screwed into an internally threaded enlarged socket in the upper end of the tubular clamp 8. Within the valve casing is an enlarged chamber 20 for containing the check valve proper and having an internal shoulder 21 to support the valve proper. A bore or passageway 22 extends through the nipple 19 into the chamber 20. The upper end of the chamber 20 is covered by a screw plug 23 having a flange 24 overlapping the rim of the casing and confining a packing washer 25. A vent passage 26 extends through the center of the plug 23. A shallow concave surface 126 on the inner end of plug 23, preferably of conical formation extending from the vent passage 26 to the circumference of the plug, provides the seating surface for the valve proper.

The valve proper consists of a compressible and resilient disk 27 associated with one or more (preferably two) perforated supporting disks 28. I prefer to use as the material for the valve disk 27 vulcanized rubber containing a large proportion of pure high grade rubber gum. The sheet rubber used by dentists and known as dental dam rubber is suitable, and preferable to any other material of which I have present knowledge, for my purpose. This material is highly compressible and extensible, perfectly resilient, and has the valuable property of retaining these characteristics without substantial impairment after long exposure to the air. However, I do not limit my protection to the particular material named, but include any material having sufficient compressibility, flexibility, and elasticity to serve the purposes in view.

The disks or washers 28 are substantially rigid so as to hold the sealing disk 27 in flat condition when separated from the valve seat. They are preferably made of iron in the case of check valves for application to mercury manometers, because iron has such weight that it will fall away readily and quickly from the valve seat when permitted and at the same time will float on mercury. However, I am not narrowly limited as to the material in this case either, but may make the disks 28 or equivalent disks of any other material, of less specific gravity than the indicating liquid, which also has sufficient weight and strength for the service required. These disks are made thick enough to be rigid to the extent that they will not be bent and distorted by the forces to which they are subject in this use. Their perforations are centrally located and made of a diameter preferably larger than that of the bore 22. All of the disks are slightly smaller in diameter than the chamber 20 in which they are contained in order to be movable freely up and down therein and to permit flow of air around their edges in the normal operation of the instrument. The shoulder 21 is separated so far from the valve seat 126 that when the supporting washers rest on the shoulder and the sealing disk is not otherwise held against the valve seat, a free space is left between the valve and the seat, but the height of such space is considerably less than the diameter of the disk. The sealing disk is separate from the supporting disks. That is, it merely rests on the latter when withdrawn from the valve seat and is free to be placed independently against the seat.

In the operation of a manometer equipped with my improved check valve, the normal rise and descent of the column causes the air to flow out and in through the vent passage and around the valve disks. When the column rises to a height sufficient to flood the chamber 20, and so gradually that the rising flood has an approximately level surface, it first expels the air above it, and then lifts the valve proper until the sealing disk comes to bear on the seating surface 126. On account of the concavity of this surface, the peripheral part of the disk first bears on it.

This is an important phase of the invention, since it prevents entrance of the mercury between the valve and seat at any point. Mercury is peculiar in that it is more difficult to confine than almost any other liquid, and even than air. If it finds an entrance however minute, between a valve and valve seat it will prevent tight closing of the valve and continue to escape so long as it is under pressure. But in this device the rigid flat supporting disks bring the periphery of the sealing disk against the seat before the rising mercury reaches the sealing disk, and as the mercury continues to rise the sealing disk is pressed more tightly against the seat with an area of contact over a widening zone, due to its compression and the concavity of the seat. When finally the mercury reaches the sealing disk it can only displace the central part of the disk into contact with the corresponding part of the seat and the rim of the vent passage. As such passage is very small, being shown on an enlarged scale in Fig. 2 for clearness, the disk will not be burst in the area crossing the vent by increase in the fluid pressure under the conditions in which such manometers are used.

The action just described takes place in any case where the pressure increase, whether slow or rapid, is gradual enough to cause the rising mercury to spread out and fill the valve chamber. In case the pressure is so suddenly applied as to eject the mercury from the passageway 22 in a spurt or jet, the impact of the mercury is localized on the center of the sealing disk, which may be pressed thereby against a portion of the seat immediately surrounding the vent passage, and in any case acts as a baffle excluding the mercury from the vent and turning it back into the bottom of the chamber. As the mercury accumulates in the chamber it lifts the supporting disks and brings the perimeter of the sealing disk against the valve seat in the manner already described before any opportunity has occurred for mercury to flow between the rim of the disk and the seat.

The difficult problem solved by this invention has been to seal the vent against escape of mercury with a gradual rise. Retention of a sudden spurt of mercury involves no great difficulty and is satisfactorily performed by this device. Extensive experimental and practical use has conclusively demonstrated the effectiveness of this device as a seal against loss of mercury under all conditions of use.

The principles of this device are applicable also to retention of other liquids than mercury in circumstances where similar liability of loss exists. Hence I include within the scope of the protection which I claim all embodiments for all uses in which the principles underlying the specific device here disclosed are present.

What I claim and desire to secure by Letters Patent is:

1. A check valve as and for the purpose described comprising a casing having an interior chamber and an inlet to the bottom of said chamber, the chamber having also a top wall provided with a vent passage and formed with a shallow concave seat surrounding the passage, a float in said chamber having a flat upper supporting surface, and a sealing disk of flexible and compressible resilient material resting on said supporting surface and adapted to be pressed by the float into engagement with the circumferential parts of the said seating surface.

2. A check valve as and for the purpose described comprising a casing having an interior chamber and an inlet to the bottom of said chamber, the chamber having also a top wall provided with a vent passage and formed with a shallow concave seat surrounding the passage, a float in said chamber having a flat upper supporting surface, and a sealing disk of flexible and compressible resilient material resting on said supporting surface and adapted to be pressed by the float into engagement with the circumferential parts of the said seating surface, the said vent passage and inlet being in alinement and the float having a central opening in the same alinement.

3. A check valve for mercury manometers comprising a casing having an interior chamber, a bottom inlet and an annular supporting shoulder within the chamber, a cover closing the upper end of the chamber having a vent passage and a concave valve seat surrounding the inner orifice of said passage, and a valve proper comprising a disk of flexible resilient and compressible material, and a rigid centrally perforated floatative disk having a flat upper surface to support the sealing disk.

4. A check valve for mercury manometers comprising a casing having an interior chamber, a bottom inlet and an annular supporting shoulder within the chamber, a cover closing the upper end of the chamber having a vent passage and a concave valve seat surrounding the inner orifice of said chamber, and a valve proper comprising a disk of highly compressible and elastic rubber, and a centrally apertured iron disk having a flat top surface adapted to support the rubber disk.

5. A check valve as and for the purpose described, comprising a casing having an interior chamber and an inlet to the bottom of said chamber, the chamber having also a top wall provided with a vent passage and with a seating face surrounding the lower orifice of said vent passage, a float in said chamber having an upper supporting surface, and a sealing disk of flexible and compressible resilient material resting on said supporting surface, said seating face and supporting surface having their closest approach to one another adjacent to the periphery or said disk, and one of them being recessed away from the other inwardly toward the axis of the vent passage, whereby the disk is brought by rise of the float into first engagement at its periphery with the seating face.

6. A check valve for attachment to the upper end of a mercury column manometer comprising a casing having an inlet in its bottom adapted to communicate with the manometer, an outlet vent in its top and an enlarged intermediate chamber, a valve body in said chamber substantially wider in all dimensions than said vent and symmetrically arranged with respect thereto, and means organized to cause first contact of the valve body with the top wall of the casing to take place at the peripheral part only of the valve body when rise of the mercury occurs sufficiently slowly to flood the chamber, while permitting the central part of the valve body to be forced against the rim of the vent by a jet of mercury issuing from said inlet.

In testimony whereof I have affixed my signature.

WILLIAM THOMAS.